United States Patent [19]

Lehr

[11] Patent Number: 4,711,921

[45] Date of Patent: Dec. 8, 1987

[54] STABILIZATION OF VINYL CHLORIDE POLYMERS

[75] Inventor: Marvin H. Lehr, Bath, Ohio

[73] Assignee: The B. F. Goodrich Company, Akron, Ohio

[21] Appl. No.: 917,879

[22] Filed: Oct. 10, 1986

Related U.S. Application Data

[63] Continuation of Ser. No. 440,887, Nov. 12, 1982, abandoned.

[51] Int. Cl.$^4$ ............................................... C08K 5/57
[52] U.S. Cl. .................................... 524/180; 524/181; 524/381; 524/417; 524/424
[58] Field of Search ................ 523/220; 524/381, 180, 524/181, 424, 425, 417; 525/331.5, 331.6

[56] References Cited

U.S. PATENT DOCUMENTS

| | | | |
|---|---|---|---|
| 2,365,400 | 12/1944 | Fikentscher | 524/213 |
| 2,483,959 | 10/1949 | Baer | 524/399 |
| 2,507,142 | 5/1950 | Chaban | 524/381 |
| 2,508,801 | 5/1950 | Sans | 524/399 |
| 2,663,695 | 12/1953 | Perloff et al. | 524/425 |
| 3,090,763 | 5/1963 | Hillier | 260/23 |
| 3,100,762 | 8/1963 | Shockney | 525/331.6 |
| 3,309,338 | 3/1967 | Scullin | 524/567 |
| 3,506,637 | 4/1970 | Makino | 525/331.6 |
| 3,535,220 | 10/1970 | Kato et al. | 525/331.6 |
| 3,541,185 | 11/1970 | Taima et al. | 525/331.6 |
| 3,632,848 | 1/1972 | Young et al. | 525/331.6 |
| 3,706,686 | 12/1972 | Eilers et al. | 524/180 |
| 3,764,571 | 10/1973 | Jennings et al. | 524/180 |
| 3,899,473 | 8/1975 | Johansson | 260/92.8 |
| 3,925,337 | 12/1975 | Heilberger | 525/331.6 |
| 3,996,173 | 12/1976 | Heichele | 524/425 |
| 4,049,593 | 9/1977 | Sato et al. | 524/425 |
| 4,365,040 | 8/1982 | Hall | 524/567 |
| 4,386,169 | 5/1983 | Artur et al. | 524/567 |
| 4,412,898 | 11/1983 | Olson et al. | 525/331.6 |

FOREIGN PATENT DOCUMENTS

48-37742  11/1973  Japan .
1466427   3/1977  United Kingdom .

OTHER PUBLICATIONS

Jerzy Wypych "Mechanism of Action of PVC Thermal Stabilizers" J. Applied Polymer Science, vol. 23, 39–54 (1979).
R. E. Lally et al., "Stabilization of Polyvinyl Chloride" Modern Plastics, Dec. 1949, pp. 111–116, 156–162.
"Light-Induced Degradation of Chlorinated Poly(Vinyl) Chloride Solution" Decker, et al., *Makromol Chem., Rapid Commun.*, p. 389 (1980).
Chemical Abstracts 81 107545f (1974).
Komoroski et al., Macromolecules, vol. 15, pp. 844–848 (1982).
"Thermal Decomposition of Poly(Vinyl Chloride) and Chlorinated Poly(Vinyl Chloride), I., ESR and TCA Studies" S. A. Liebman, et al., *Journal of Polymer Science* (A-1) vol. 9, pp. 1823–1833 (1971).
"Thermal Decomposition of Poly(Vinyl Chloride) and Chlorinated Poly(Vinyl Chloride), II., Organic Analysis," S. A. Liebman, et al., *Journal of Polymer Science* (A-1), vol. 9, pp. 1921–1935 (1971).
"Heat Stability of Chlorinated PVC", V. V. Lisitskii, et al., *Plasticheskie Massy*, No. 3, p. 36, (1981).

*Primary Examiner*—Veronica P. Hoke
*Attorney, Agent, or Firm*—Woodrow W. Ban

[57] ABSTRACT

The invention provides an improved heat stabilization of post-chlorinated vinyl chloride polymers utilizing barium carbonate or cadmium carbonate that has a surface area greater than $2M^2/g$.

9 Claims, No Drawings

STABILIZATION OF VINYL CHLORIDE POLYMERS

This is a continuation of application Ser. No. 440,887, filed 11/12/82, now abandoned.

BACKGROUND OF THE INVENTION

Most synthetic polymer materials undergo deterioration when exposed to light and elevated temperatures over a prolonged period of time. Some polymers are so sensitive to heat that they will degrade objectionably even during the relatively short period of time they are exposed to elevated temperatures during many types of compounding and processing operations. The degradation effects of heat and light on polymers often can be at least temporarily retarded by mixing a heat and light stabilizer (normally referred to as a "primary stabilizer") with the polymer. The particular primary stabilizer chosen will depend upon the polymer to be stabilized.

Chlorine-containing synthetic polymers (whether the chlorine atom is introduced as a part of a monomer or is added by the post-chlorination of a previously formed polymer) are quite susceptible to heat degradation at most normal processing temperatures and, as a consequence, stabilization of the polymer is of significant importance.

Typical primary stabilizers used commercially for stabilizing chlorine-containing polymers include a wide variety of materials such as the barium, cadmium, zinc, tin and lead salts of monocarboxylic acids and the organotin and organoantimony stabilizers. Generally, from about 0.5 to 5.0 parts by weight of a primary stabilizer is used per 100 parts by weight of the polymer. However, even with the addition of a primary stabilizer, the polymer composition often is not sufficiently heat-stabilized to permit the composition to be used in processing techniques that require the composition to be heated to moderately high temperatures (for example, product forming by injection molding). Also, the cost of many of the preferred primary stabilizers is relatively high. Accordingly, stabilizer systems which provide better heat stabilization at a reduced cost are sought by the industry.

SUMMARY OF THE INVENTION

The present invention provides a stabilization system for vinyl chloride polymers that is able to produce increased thermal stability at a significant cost savings over many of the stabilizer systems currently in use. In accordance with this invention, barium carbonate or cadmium carbonate are used either alone or in combination with other stabilizers for vinyl chloride polymers to produce the desired stabilization. In order to obtain the desired stabilization, the barium carbonate or cadmium carbonate should have a surface area of at least 2 square meters per gram ($M^2/g$) and preferably a surface area of at least 3 $M^2/g$. Desirably, the barium carbonate or cadmium carbonate has a particle size of less than 10 micrometers ($\mu m$). Although both barium carbonate and cadmium carbonate have proven to be effective in stabilizing vinyl chloride polymers, not all of the carbonate salts of metals of Group II of the Periodic Table produce the desired level of stabilization when combined with vinyl chloride polymers. For example, calcium carbonate, strontium carbonate and magnesium carbonate have not been found to produce the desired stabilization.

DETAILED DESCRIPTION OF THE INVENTION

The present invention utilizes particulate barium carbonate and/or cadmium carbonate, either alone or in combination with other stabilizers, to stabilize vinyl chloride polymers. As indicated hereinbefore, the barium carbonate or cadmium carbonate should have a surface area (when measured as described in the article by P. H. Emmett and E. Teller appearing in the Journal of American Chemical Society, Vol. 60, Page 309 (1938) of at least 2 $M^2/g$, and preferably a surface area of at least 3 $M^2/g$, and, desirably, has a particle size below 10 $\mu m$.

The term "vinyl chloride polymer", as used herein, includes homopolymers of vinyl chloride (polyvinyl chloride polymers), homopolymers of vinylidene chloride (polyvinylidene chloride polymers), copolymers of vinyl chloride or vinylidene chloride with up to 30 percent by weight of at least one other copolymerizable monoolefinic or vinyl-type comonomer (such as vinylidene chloride, vinyl acetate, methyl acrylate, methyl methacrylate, styrene, acrylonitrile, ethylene, propylene, and the like), and post-chlorinated homopolymers of vinyl chloride or vinylidene chloride (post-chlorinated polyvinyl chloride polymers and post-chlorinated polyvinylidene chloride polymers) and post-chlorinated copolymers of vinyl chloride or vinylidene chloride with up to 30 percent by weight of at least one other copolymerizable monoolefinic or vinyl-type comonomer. Preferred vinyl chloride polymers for use in the present invention are post-chlorinated vinyl chloride polymers having a density in the range of from about 1.46 to about 1.65 grams/cc at 25° C. and a chlorine content in the range of from about 60% to about 72% by weight.

Typical primary stabilizers which may be used in conjunction with the barium carbonate or cadmium carbonate include the dialkyltin and alkylantimony stabilizers, for example, dibutyltin dilaurate, dibuytltin maleate, di-n-octyltin maleate, dibutyltin bis(lauryl mercaptide), di-butyltin S,S-bis(isooctyl thioglycolate), di-butyltin β-mercaptoprorionate, di-n-octyltin, S,S-bis-(isooctyl thioglycolate), di-n-octyltin-mercaptoprorionate, and antimony S,S',S"-tris(isooctyl thioglycolate).

About 2.0 to 15.0 parts by weight of barium carbonate or cadmium carbonate per 100 parts by weight of the vinyl chloride polymer desirably is used in the composition, although from 3.0 to 8.0 parts by weight of barium carbonate or cadmium carbonate per 100 parts by weight of the vinyl chloride polymer is preferred. If a dialkyltin or alkylantimony stabilizer is used in conjunction with the barium carbonate or cadmium carbonate, desirably about 0.5 to 5.0 parts by weight of the dialkyltin or alkylantimony stabilizer is used per 100 parts by weight of the vinyl chloride polymer.

Even further improvement in stabilization of the vinyl chloride polymer can be realized if the particles of barium carbonate or cadmium carbonate are partially "neutralized" with an acid, such as citric acid, malic acid, tartaric acid, or phosphorous acid. The partial neutralization can be effected by treating the particulate barium carbonate or cadmium carbonate with an amount of acid to "neutralize" from about 1/20 to 1/5 by weight of the carbonate salt. The treatment of the carbonate with the acid produces a reaction of the acid with barium carbonate or cadmium carbonate at the surfaces of the particles.

The addition of from about 0.01 to 5.0 parts by weight per 100 parts by weight of the vinyl chloride polymer of sodium citrate or potassium citrate or a metal salt of phosphoric acid having a particle size below 30 μm further enhances stabilization of the vinyl chloride polymer, particularly when a dialkyltin stabilizer also is present in the composition.

The vinyl chloride polymer composition also can include other compounding ingredients (such as reinforcing materials, fillers, lubricants, etc.) that normally are included in vinyl chloride polymer compositions.

The following examples illustrate the present invention more fully. The heat stability of the compositions tested was determined by measuring the "dynamic thermal stability" (DTS) of the composition using a Brabender Plastic-Corder torque rheometer with a No. 5 roller head (Model PLV 300). DTS is the time interval, expressed in minutes, between the start of mixing and breakdown (determined by a sudden increase in torque and change in melt temperature). A 3 minute warm-up period of the sample in the Brabender bowl was allowed before testing of the sample was begun.

EXAMPLE I

A series of compositions were formed according to the formulations set forth in Table I by blending the ingredients together on a two-roll mill at about 200° C. for 2 minutes. The DTS of each composition was measured. The results of the tests are reported in Table I.

TABLE I

| Materials | Sample 1 | 2 | 3 (Grams) | 4 | 5 |
|---|---|---|---|---|---|
| CPVC[1] | 100 | 100 | 100 | 100 | 100 |
| Barium carbonate[2] | — | 5.0 | 5.0 | — | — |
| Cadmium carbonate[3] | — | — | — | 5.0 | 5.0 |
| Organotin Stabilizer[4] (Thermolite 31) | 2.0 | — | 2.0 | — | 2.0 |
| Polyethylene lubricant[5] | 1.25 | 1.25 | 1.25 | 1.25 | 1.25 |
| DTS (minutes)* | 11 | 7 | 20 | 6 | 23 |

*Brabender: 65 g. sample, 225° C. bowl temp., 45 rpm
[1]Post-chlorinated polyvinyl chloride resin, GEON 603 × 560 produced by The B. F. Goodrich Company, 66% by weight of chlorine
[2]With a surface area of 3.45 M²/g.
[3]With a surface area of 3.53 M²/g.
[4]Dibutyltin-S,S'-bis(isooctyl mercaptoacetate).
[5]AC-629A produced by Allied Chemical Corporation.

EXAMPLE II

A series of compositions were formed according to the formulations set forth in Table II by blending the ingredients together on a two-roll mill at about 200° C. for 2 minutes. The DTS of each composition was measured. The results of the tests are reported in Table II.

TABLE II

| Materials | Sample 1 | 2 | 3 (Grams) | 4 | 5 |
|---|---|---|---|---|---|
| CPVC (GEON 603 × 560) | 100 | 100 | 100 | 100 | 100 |
| PE AC-629A | 1.5 | 1.5 | 1.5 | 1.5 | 1.5 |
| Organotin stabililzer (Thermolite 31) | 2.0 | 2.0 | 2.0 | 2.0 | 2.0 |
| Barium malate | — | — | — | 0.5 | — |
| Potassium citrate (particle size - less than 30 μm) | — | — | — | — | 0.5 |
| Barium carbonate | — | 5.0 | — | 5.0 | 5.0 |

TABLE II-continued

| Materials | Sample 1 | 2 | 3 (Grams) | 4 | 5 |
|---|---|---|---|---|---|
| (surface area - 1.90 M²/g) | | | | | |
| Barium carbonate[1] (treated) | — | — | 5.0 | — | — |
| DTS (minutes)* | 11 | 15.5 | 20.5 | 24 | 25 |

*Brabender: 65 g. sample, 225° C. bowl temp., 45 rpm
[1]79 grams (0.40 mole) of barium carbonate powder (surface area - 1.90 M₂/g) was slurried in 400 cc of 50/50 water/methanol. 5.36 grams (0.040 mole) of malic acid dissolved in 100 cc of water were added to the aforesaid barium carbonate slurry. The resulting mixture was stirred for 30 minutes. The mixture was filtered and the treated barium carbonate residue was dried in a vacuum oven at 100° C. for 146 hours.

EXAMPLE III

A series of compositions were formed according to the formulations set forth in Table III by blending the ingredients together on a two-roll mill at about 200° C. for 2 minutes. The DTS of each composition was measured. The results of the tests are reported in Table III.

TABLE III

| Materials | Sample 1 | 2 (Grams) | 3 |
|---|---|---|---|
| PVC[1] | 100 | 100 | 100 |
| Titanium dioxide | 5.0 | 5.0 | 5.0 |
| PE AC-629A | 1.5 | 1.5 | 1.5 |
| Barium carbonate (surface area - 3.45 M²/g) | — | 5.0 | — |
| Barium carbonate[2] (treated) | — | — | 5.0 |
| Organotin stabilizer (Thermolite 31) | 2.0 | 2.0 | 2.0 |
| DTS (minutes)* | 17 | 22 | 32 |

*Brabender: 65 g. sample, 225° C. bowl temp., 45 rpm
[1]Polyvinyl chloride 103EP produced by The B. F. Goodrich Company, 56.5% by weight chlorine.
[2]79 grams (0.40, mole) of barium carbonate powder (surface area - 3.45 M² /g) was slurried in 400 cc of 50/50 water/methanol. 5.52 grams (0.027 mole) of citric acid monohydrate dissolved in 100 cc of water were added to the aforesaid barium carbonate slurry. The resulting mixture was stirred for 30 minutes. The mixture was filtered and the treated barium carbonate residue was dried in a vacuum oven at 100° C. for 16 hours.

EXAMPLE IV

A series of compositions were formed according to the formulations set forth in Table IV by blending the ingredients together on a two-roll mill at about 200° C. for 2 minutes. The DTS of each composition was measured. The results of the tests are reported in Table IV.

TABLE IV

| Materials | Sample 1 | 2 | 3 (Grams) | 4 | 5 |
|---|---|---|---|---|---|
| CPVC (GEON 603 × 560) | 100 | 100 | 100 | 100 | 100 |
| Polyethylene lubricant[1] | 1.5 | 1.5 | 1.5 | 1.5 | 1.5 |
| Organotin stabilizer (Thermolite 31) | 2.0 | 2.0 | 2.0 | 2.0 | 2.0 |
| Barium carbonate (surface area - 3.45 M²/g) | — | 5.0 | — | — | — |
| Barium carbonate - malic acid treated (see Ex. II) | — | — | 5.0 | — | — |
| Barium carbonate citric acid - treated (see Ex. III). | — | — | — | 5.0 | — |
| Barium carbonate[2] (treated) | — | — | — | — | 5.0 |

TABLE IV-continued

| Materials | Sample | | | | |
|---|---|---|---|---|---|
| | 1 | 2 | 3 | 4 | 5 |
| | (Grams) | | | | |
| DTS (minutes)* | 11 | 19 | 21 | 30 | 28 |

*Brabender: 65 g. sample, 225° C. bowl temp., 45 rpm
(1)AC-629A produced by Allied Chemical Company.
(2)79 grams (0.40) mole of barium carbonate powder (surface area - 3.45 M²/g was slurried in 400 cc of 50/50 water/methanol. 5.52 grams (0.040 mole) of monobasic sodium phosphate dissolved in 100 cc of water were added to the aforesaid barium carbonate slurry. The resulting mixture was stirred for 30 minutes. The mixture was filtered and the treated barium carbnoate residue was dried in a vacuum oven at 100° C. for 16 hours.

EXAMPLE V

A series of compositions were formed according to the formulations set forth in Table V by blending the ingredients together on a two-roll mill at about 200° C. for 2 minutes. The DTS of each composition was measured. The results of the tests are reported in Table V.

TABLE V

| Materials | Sample | | | | | |
|---|---|---|---|---|---|---|
| | 1 | 2 | 3 | 4 | 5 | 6 |
| CPVC (GEON 603 × 560) | 100 | 100 | 100 | 100 | 100 | 100 |
| PE AC-629A | 1.5 | 1.5 | 1.5 | 1.5 | 1.5 | 1.5 |
| Organotin stabilizer (Thermolite 31) | 2.0 | 2.0 | 2.0 | 2.0 | 2.0 | 2.0 |
| Barium carbonate (surface area - 1.90 M²/g) | — | — | — | 5.0 | 5.0 | 5.0 |
| Potassium citrate (particle size - less than 30 μm) | — | 0.5 | 1.0 | — | 0.5 | 1.0 |
| DTS (minutes)* | 11 | 17 | 22 | 14 | 25 | 39 |

*Brabender: 65 g. sample, 225° C. bowl temp., 45 rpm.

EXAMPLE VI

A series of compositions were formed according to the formulations set forth in Table VI by blending the ingredients together on a two-roll mill at about 200° C. for 2 minutes. Ferric acetylacetonate was included in Samples 6-11 in the amounts indicated. The DTS of each composition was measured. The results of the tests are reported in Table VI.

TABLE VI

| Materials | Sample | | | | | | | | | | |
|---|---|---|---|---|---|---|---|---|---|---|---|
| | 1 | 2 | 3 | 4 | 5 | 6 | 7 | 8 | 9 | 10 | 11 |
| | (Grams) | | | | | | | | | | |
| CPVC(1) | 100 | 100 | 100 | 100 | 100 | 100 | 100 | 100 | 100 | 100 | 100 |
| PE AC-629A | 1.25 | 1.25 | 1.25 | 1.25 | 1.25 | 1.25 | 1.25 | 1.25 | 1.25 | 1.25 | 1.25 |
| Organotin stabilizer (Thermolite 31) | 3.0 | 3.0 | 3.0 | 3.0 | 3.0 | 3.0 | 3.0 | 3.0 | 3.0 | 3.0 | 3.0 |
| Barium carbonate (surface area - 3.45M²/g) | — | 5.0 | 5.0 | 5.0 | — | — | — | — | 5.0 | 5.0 | 5.0 |
| Potassium citrate (particle size - less than 30 μm) | — | — | 0.5 | 1.0 | 0.5 | — | 0.5 | — | — | 0.5 | 1.0 |
| | *(Parts per Million) | | | | | | | | | | |
| Ferric acetylacetonate* | — | — | — | — | — | 1.6 | 1.6 | 8.0 | 8.0 | 8.0 | 8.0 |
| DTS (minutes)** | 8 | 13 | 18 | 19 | 13.5 | 5 | 12 | 3 | 10 | 16 | 18 |

**Brabender: 67 g. sample, 225° C. bowl temp., 45 rpm.
(1)Post-chlorinated polyvinyl chloride, GEON 666 × 512 produced by The B. F. Goodrich Company, 63.5% by weight of chlorine.

The test results of Example VI illustrate the deleterious effect which iron contamination in vinyl chloride polymer has on heat stability and that the deleterious effect can be overcome effectively through the use of the present invention.

The stabilized vinyl chloride polymer compositions of the present invention can be formed into products in the customary ways such as by injection molding, extrusion, sheeting, closed-mold shaping, etc.

As can be seen from the description and example, the present invention provides a means for more effectively stabilizing vinyl chloride polymers while at the same time realizing a cost savings by permitting smaller quantities of relatively expensive stabilizers to be used while maintaining a desired level of heat stabilization.

While the present invention has been described in terms of its specific embodiments, certain modifications and equivalents will be apparent to those skilled in the art.

I claim:

1. A composition comprising a post-chlorinated vinyl chloride polymer and a heat stabilization system comprised of one of particulate barium carbonate and cadmium carbonate, said barium carbonate or cadmium carbonate having a surface area of at least 2 square meters per gram and is present at a concentration range of from about 2.0 to 15.0 parts per 100 parts by weight of the polymer and as a second stabilizer, a dialkyltin compound which is present within the quantity range of 0.5 and 5.0 parts per 100 parts by weight of the polymer.

2. The composition of claim 1 wherein said composition further contains as an additional stabilizer a compound selected from the group of sodium citrate, potassium citrate or a phosphoric acid metal salt, in an amount between about 0.01 and 5.0 parts per 100 parts by weight of said vinyl chloride polymer.

3. The composition of claim 1 wherein said barium carbonate or cadmium carbonate has a particle size of less than 10 μm.

4. The composition of claim 1 wherein said composition contains from 3.0 to 8.0 parts by weight of said barium carbonate or cadmium carbonate per 100 parts by weight of said vinyl chloride polymer.

5. The composition of claim 1 wherein said vinyl chloride polymer is a post-chlorinated vinyl chloride polymer having a density in the range of from about 1.46 to about 1.65 grams/cc at 25° C. and a chlorine content in the range of from about 60% to about 72% by weight.

6. The composition of claim 1 wherein said post-chlorinated vinyl chloride polymer is a post-chlorinated polyvinyl chloride homopolymer.

7. The composition of claim 2 wherein said post-chlorinated vinyl chloride polymer is a post-chlorinated vinyl chloride polymer having a density in the range of from about 1.46 to about 1.65 grams/cc at 25° C. and a chlorine content in the range of from about 60% to about 72% by weight.

8. The composition of claim 2 wherein said post-chlorinated vinyl chloride polymer is a post-chlorinated polyvinyl chloride homopolymer.

9. The composition of claim 1 wherein said barium carbonate or cadmium carbonate has been partially neutralized with an acid.

* * * * *